United States Patent [19]

Gary et al.

[11] 3,875,464
[45] Apr. 1, 1975

[54] SOLID STATE OVERLOAD RELAY

[75] Inventors: Wardell Gary; Emroy W. Lange, both of Beaver, Pa.

[73] Assignee: Westinghouse Electric Corporation, Pittsburgh, Pa.

[22] Filed: Oct. 10, 1973

[21] Appl. No.: 405,198

[52] U.S. Cl. ........ 317/13 R, 317/33 SC, 317/36 TD, 340/253 A
[51] Int. Cl. ............................................. H02h 7/085
[58] Field of Search .......... 317/13 R, 36 TD, 33 SC; 340/253 A

[56] References Cited
UNITED STATES PATENTS

| | | | |
|---|---|---|---|
| 3,602,771 | 8/1971 | Walstad et al. | 317/13 R |
| 3,619,668 | 11/1971 | Pinckaers | 317/13 R |
| 3,742,302 | 6/1973 | Neill | 317/13 R |

*Primary Examiner*—James D. Trammell
*Attorney, Agent, or Firm*—H. G. Massung

[57] ABSTRACT

An electronic overload relay connectable in series with the operating coil of a contactor for protecting a motor from overheating due to carrying greater than desired current. The disclosed overload relay includes a time delayed reset feature which does not require control power to provide the delayed reset. The delayed reset prevents an operator from restarting a motor before it has cooled off by interrupting power to the overload relay and then reapplying power. The time delayed reset includes means for transferring energy stored in the sensing and tripping portions during the overload period to an energy storage device which prevents power from being reapplied to the electric motor until a predetermined time after the overload relay has tripped. The transferred energy is discharged through a timing resistor until a predetermined point is reached at which time the overload relay can be again closed. A light emitting diode is provided to indicate that the overload relay is in the tripped mode and power cannot be applied to the protected motor. Operation of the overload trip relay is unaffected by connecting or disconnecting power to the motor during normal operation.

17 Claims, 1 Drawing Figure

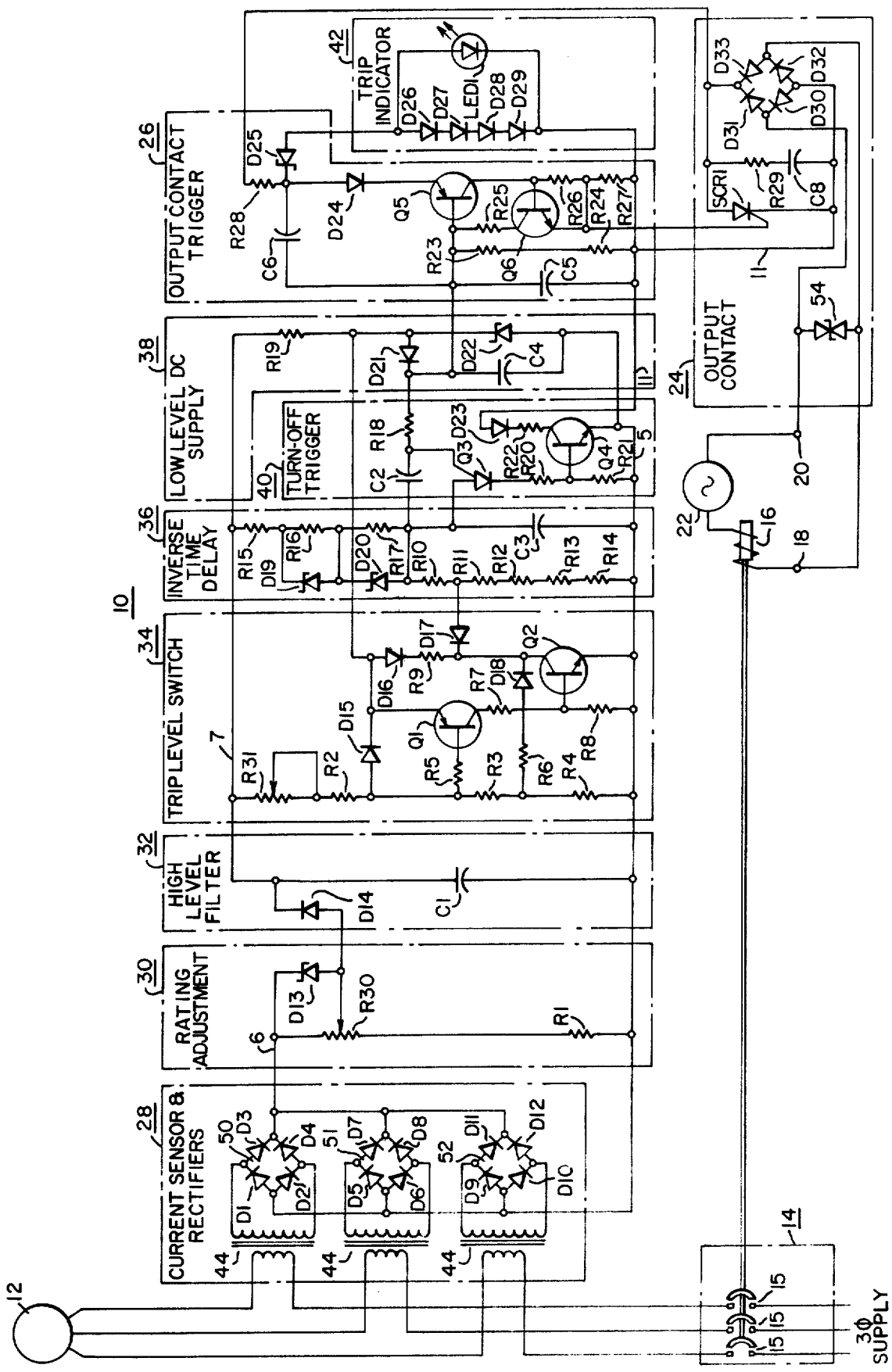

3,875,464

SOLID STATE OVERLOAD RELAY

BACKGROUND OF THE INVENTION

This invention relates to overcurrent trip relay devices and more particularly to such devices of the time delay type.

For controlling electric motors it is desirable to have an overload relay that protects motors from overheating when they conduct current greater than the normal full load current of the motor, such as, during starting or when the motor is subjected to mechanical overload while running. It is desirable to have an electronic overload relay that is functionally equivalent to the thermal overload relay with an automatic reset. That is it is desirable to have an electronic relay which trips the circuit due to an overload and cannot be reset for a predetermined time after tripping. This delayed reset timing period allows the motor to cool off before power can be reapplied. It is desirable that the time delay period before which the motor can be restarted be unaffected by the absence or presence of voltage on the control circuit. In some prior art overload relays, the time delay sequence for restarting of the motor can be defeated by switching the power off and on. In other prior art control relays such as disclosed in U.S. Pat. No. 3,602,771 or 3,700,914 the time delay reset period is introduced whenever power is interrupted to the motor for any reason. In still other prior art overload relays a time delay after power application is required before the motor can be initially started. It is desirable to have an overload relay that is responsive to overload current but which does not affect initial or subsequent starting or stopping of the motor when an overload is not involved. It is also desirable that the overload relay prevent the reapplication of power to the motor for a time after an overload current has caused the overload to trip. It is desirable that no external power will be necessary for obtaining this reset time delay, and when control power is applied it is desirable to have a visual indication that the overload relay is in the time delay reset sequence and is preventing the contactor which connects the motor to the power supply from being energized.

SUMMARY OF THE INVENTION

An electronic overload relay connectable in series with the operating coil of a contactor for protecting the motor from overheating due to carrying greater than normal current is provided. The overload relay has output terminals which are connected in series with the contactor coil. The output terminal is switchable between a high resistance level, called the open position, where current to the coil is limited and the contactor is deenergized and a low resistance level, called the closed position, where current through the contactor coil is sufficient to energize the contactor. An output contact trigger is connected to the output contact or terminal for switching the output contact between the open high resistance level and the closed low resistance level. Current sensors are provided which supply a signal proportional to the motor current. This output signal from the current sensors is fed through a trip level switch and a time delay which energizes the output terminal trigger circuit after motor current exceeds a predetermined value for a period of time. When the output contact trigger circuit is energized, it switches the output contact to a high resistance level deengergizing the motor contactor. The output contact trigger circuit includes an energy storage means which can be a timing capacitor which is charged when the output contact trigger circuit is energized. This timing capacitor is connected to keep the output contact trigger circuit energized for a predetermined time after the engergizing signal is removed. This prevents the contactor from being quickly reenergized after an overload condition.

The electronic overload relay provided protects motors from overheating when they conduct current greater than the normal full load current of the motor, such as may be present during starting or when the motor is subjected to excessive mechanical overload. An important part of the disclosed overload is the time delay reset that does not require power on to provide the delayed reset. This makes it impossible for an operator to restart the motor before it is cooled off by interrupting power to the relay and then reapplying power. The overload relay provides protection for the motor by sensing the current through the motor and if an overload current persists for a sufficient trip time, it automatically deenergizes the contactor that connects the motor to the power source. The overload trip time period is inversely proportional to the magnitude of the motor current. After the overload trips the contactor a time delayed reset in the output terminal trigger is activated. Timing of the time delay is unaffected by the absence or presence of voltage upon the contactor control circuit. This lockout feature of the time delayed reset is accomplished by transferring energy that is stored in a portion of the circuit during the overload period to a timing capacitor in the output contact trigger which charges the timing capacitor, in the time delayed reset, to a higher voltage level. The timing capacitor is connected in the voltage sensitive output terminal trigger circuit, which triggers the output terminal closed or to a low resistance level on each half cycle when the voltage on the timing capacitor is equal to or less than a threshold voltage level. When the voltage on the timing capacitor reaches the threshold level after energy is transferred from the sensing inverse time delay circuit the output contact trigger circuit is turned off and the output terminals are kept at a high resistance level. Turning the output contact trigger circuit off and opening or switching the output terminal to a high resistance level deenergizes the contactor and interrupts power to the motor. The charged timing capacitor then discharges at a certain rate through timing resistor until its voltage level drops below the threshold level at which time the output terminal closes again. The timing resistors determines the discharge rate and the time delay before which the contactor can be again energized. The time delay period allows the motor to cool off before power is reapplied. The time delay reset provides operation that is functionally equivalent to a thermal overload with automatic reset. A trip indicator circuit utilizing a light emitting diode as an indicator is provided to show that the time delayed reset is timing out and the motor contactor cannot be energized.

It is an object of this invention to provide an overload relay that will protect a motor against overcurrent and which operate only due to overcurrent to prevent the motor from being restarted for a predetermined time period after the overload relay causes the motor to be deenergized.

It is a further object of this invention to provide an overload relay with an automatic reset which has a time delay before reset in which the time delayed period is indicated by a light source.

BRIEF DESCRIPTION OF THE DRAWINGS

For a better understanding of the invention, reference may be had to the preferred embodiment exemplary of the invention shown in the accompanying drawing, in which:

FIG. 1 is a schematic showing an electronic overload relay utilizing the teaching of the present invention.

DESCRIPTION OF THE PREFERRED EMBODIMENT

Referring now to the drawing, there is shown a motor overload 10 utilizing the teaching of the present invention. An electric motor 12 is supplied power through a contactor 14 having an operating coil 16. Operating coil 16 is connected in series with terminals 18 and 20 to an alternating current control power supply 22. Terminals 18 and 20 are connected to an output contact 24 which acts as a switch and can be switched to an open position having a high resistance level and a closed position having a low resistance level. When contact 24 is in the open position with a high resistance level only a very small current can flow through coil 16 and contactor 14 cannot be energized. When output contact 24 is in the closed position, most of the voltage drops is across the coil 16 with sufficient current flowing through coil 16 to energize contactor 14. The opening or closing of output contact 24 is controlled by the output contact trigger 26. Current sensors and rectifiers 28 supply an output signal along line 6 proportional to the load current flowing to motor 12. The output signal is fed to a rating adjustment circuit 30 which can vary the amplitude of the output signal. Connected to the output of rating adjustment circuit 30 is a high level filter 32 which smooths the output signal. The output signal is then fed, along line 7, to a trip level switch circuit 34, an inverse time delay circuit 36, and a low level DC supply circuit 38. Inverse time delay circuit 36 is connected to activate a turnoff trigger circuit 40, after a time delay, when a magnitude of the output signal surpasses a given value. Trip level switch 34 determines the amplitude of the output signal, on line 7, which will allow inverse time delay circuit 36 to time out. The time delayed period supplied by time delay circuit 36 is inversely related to the amplitude of the current flowing to motor 12. That is, for a larger overload current a shorter time delay will be supplied. After the inverse time delay circuit times out and activates turnoff trigger circuit 40 a signal is fed to output contact trigger circuit 26 which in turn turns off or opens output contact 24. Low level DC supply circuit 38 supplies a reference signal to the turnoff trigger circuit 40 and the inverse time delay circuit 36 for determining the time delay after which the output contact trigger circuit 26 is energized. The low level DC supply 38 also contains an energy storage device which transfers energy to another energy storage device in the output contact trigger circuit 26 when the turnoff trigger circuit 40 is activated. The storage energy device in output contact trigger circuit 26 provides a time delay during which the overload relay 10 cannot be reset. This time delay is independent of any voltage supplied by the AC control power supply 22 to the overload relay 10. When the AC control power supply 22 is connected to supply control power to overload relay 10, a tripped indicator circuit 42 will give a visual signal, when the reset time delay is operating, to indicate that the output contact 24 is opened and contactor 14 cannot be energized.

Operation of the solid state overload relay will now be described for a load current flowing to motor 12 which is less than the trip level setting of relay 10. When control voltage is applied to the output contact 18 and 20, through the low resistance coil 16, which for example for a size one contactor has a resistance of approximately 600 ohms, most of the voltage will appear across the high resistance of the solid state output contact 24, having a resistance of approximtely 6000 ohms. The voltage across the output contact 24 is rectified by the full wave bridge formed from diodes D30, D31, D32 and D33. This rectified voltage is then applied to resistor R29, capacitor C8, the thyristor SCR1, and the output contact trigger current limiting resitor R28. Initially SCR1 blocks current flow and the current then flows through resistor R28, diode D24, the emitter base junction of transistor Q5 through capacitor C5 and resitors R23 and R24 and back through the negative bus 11. Current flow through the emitter base junction of transistor Q5 turns on transistor Q5 causing current to flow through the collector of Q5 and through the emitter base junction of transistor Q6. Transistor Q6 turns on and conducts current through the gate cathode junction of SCR1, turning on SCR1 which causes the resistance of output contact 24 to drop to a low level. SCR1 conducting causes the voltage on the output contact 24 to drop to a very low level approximately 2 volts thus applying most of the control voltage across the contactor coil 16. This energizes the contactor 14 and closes the contacts 15 of the contactor 14 and allows current to flow through the motor windings and the primary of the current sensors 44.

When SCR1 turns on and shorts out the output contact 24 almost all of the voltage is removed from the output contact trigger circuit 26 and the gate trigger current which flows along line 46 is removed from the thyristor SCR1. SCR1 will turn off each half cycle when the current through it goes to zero, but will be triggered on at the beginning of each new current half cycle as described above. During normal operation the off time of SCR1 at the beginning of each current half cycle is very small compared to the on time and does not result in an appreciable reduction in the line voltage applied to the contactor coil 16. Under normal operating conditions, SCR1 will be rapidly switched on by the output contact trigger circuit 26 at the beginning of each current half cycle thus permitting current to flow through contactor coil 16 energizing contactor 14.

Output current from the secondary of the current sensors 44 are rectified by full wave bridge rectifiers 50, 51, and 52 and produces a DC voltage across the rating adjustment circuit 30. Full wave bridge 50 comprises diodes D1, D2, D3 and D4, full wave bridge 51 comprises diode D5, D6, D7 and D8 and full wave bridge 52 comprises diodes D9, D10, D11 and D12. Rating adjustment circuit 30 comprises resistor R1 and adjustable potentiometer R30. Depending on where the rating adjustment potentiometer R30 is set, a percentage of the output signal voltage applied to rating adjustment circuit 30 is fed through the isolating diode of the high level filter 32. Zener diode D13 is used when the rating adjustment potentiometer R30 is set at the minimum output voltage to give a uniform trip curve at the minimum and maximum settings. The percentage of the output signal voltage which can be fed through the rating adjustment circuit 30 is from 66 to 100 percent of the output signal applied. Capacitor C1 in high level filter 32 helps smooths out the output signal voltage from rating adjustment circuit 30. The high level DC voltage is then fed to the trip level switch 34, the inverse time delay circuit 36 and the low level DC voltage supply 38. The voltage is fed in the low level DC supply through resistor R19 through diode D21 to capacitor C4. The voltage on the low level DC supply capacitor C4 then rises to approximately 15 volts and biases the gate programmable unijunction transistor Q3 which is located in the turnoff trigger circuit 40. This will cause triggering of Q3 when approximately 15 volts is applied to the anode of Q3. At the same time, the DC voltage drop across Zener diode D22 biases the emitter of transistor Q1 in the trip level switch 34 to 15 volts so that transistor Q1 will be off when its base voltage is equal to or above 15 volts. Resistors R15, R16, R17, R10, R11, R12, R13, and R14 comprises a resistor divider network with the ratio of approximately 89.5 percent across the timing capacitor C3, when transistor Q2 is turned off and non-conducting. With the transistor Q2 conducting, and essentially shorting out resistors R11, R12, R13 and R14 through diode D17 to terminal line 5 approximately 50.5 percent of the supplied output voltage is applied across the timing capacitor C3. Since the base current of Q2 is supplied through resistor R7 and the collector of transistor Q1, transistor Q2 conducts when Q1 is conducting. The high level DC voltage value for which Q1 turns off is determined by the settng of adjustable potentiometer R31 and the values of resistors R2, R3, and R4. For the circuit disclosed, the turn off point is adjustable between 20 and 22 volts. For the condition being described, where the motor current is below the trip level Q1 and Q2 will be conducting. Since the inverse time delay circuit is connected to the high level filter 32 the maximum voltage that the timing capacitor C3 will charge to, and hence the voltage that the anode of Q3 will rise to when the current through the sensor is below the trip level is at most 50.5 percent of 22 volts or approximately 11.11 volts. This is well below the trip level setting of the 15 volts for programmable unijunction transistor Q3 and the contactor 14 will remain energized.

For motor load current equal to or greater than the trip current, the output contact 24 will be switched to the open condition, having a high resistance, deenergizing contactor 14. When the current through sensors 44 is equal to or greater than the trip current, determined by rating adjustment circuit 30, transistors Q1 and Q2 will be biased off. With Q1 and Q2 off the maximum voltage timing capacitor C3 can charge to with the trip level switch R31 set at the minimum switching level or 20 volts is 89.5 percent of 20 or 17.9 volts. The voltage on timing capacitor C3 will not reach the 17.9 volt level because programmable unijunction transistor Q3 will be triggered when the anode of Q3 reaches 15 volts. When Q3 trips the 15 volt signal on the anode of Q3 supplied through capacitor C3 will be discharged through Q3. From a cold start with all components completely discharged C3 must initially charge from zero volts to 15 volts before Q3 will trip while on an overload condition where the motor has been running for a period of time, a charge will already be present on capacitor C3 and when an overload occurs, capacitor C3 must only charge from this initial voltage to 15 volts for tripping transistor Q3. Resistors R31, R2, R3 and R4 form a voltage dividing circuit which is used in the trip level switch for determining the level at which Q2 turns off. Resistor R6 is a feedback resistor provided for sharp turn on and turn off of transistor Q2, and diode D18 is an isolating diode. Diode D16 is an isolating diode and resistor R9 is a limiting resistor which limits the curent drain of Q2 on the low level DC supply 38. Resistor R8 is a bias stabilizing resistor for Q2. Zener diodes D19 and D20 are used to shape the inverse time characteristic of the inverse time delay circuit 36. The DC supply voltage across Zener diode D22 biases the emitter of Q1 and the trip level switch to 15 volts so that Q1 will be off when its base voltage is equal to or above 15 volts. Diode D21 is an isolating diode to limit the drain on capacitor C4 and resistor R18 is a limiting resistor to limit the discharge of the low level DC supply 38 through Q3 when Q3 is on. Capacitor C2 connected around programmable unijunction transistor Q2 is a noise suppression filter to prevent nuisance tripping of Q3. With an overload current applied to motor 14, initial operation of the output contact trigger 26 and the output contact 24 will be as described above. If the overload current is greater than the trip current set by rating adjustment 30 transistor Q1 and Q2 will be shut off and the maximum voltage that the timing capacitor C3 can charge to its 89.5 percent of 20 volts if the trip level switch 34 is set at the minimum switching level of 20 volts. Voltage on the timing capacitor C3 will not reach 17.9 volts because programmable unijunction transistor Q3 will trip when the anode voltage reaches 15 volts. When Q3 is triggered on, it conducts current through the base emitter junction of transistor Q4 which causes Q4 to conduct and short the negative bus 11 to the common line 5 of the input circuit. Resistor R21 is a bias stabilizing resistor for Q4 and resistor R20 is a current limiting resistor. Diode D23 is an isolating diode. When transistor Q4 conducts, C5 becomes connected across the low level DC supply capacitor C4 through isolating diode D23, limitng resistor R22 and transistor Q4. Some of the energy in capacitor C4 is transferred to capacitor C5 in the output contact triggering circuit 26. This energy transfer takes place by the discharging of capacitor C4 into energy storage capacitor C5 until the voltage on C4 and C5 are almost equal at approximately 12 volts differing only by 1 diode drop difference. With the voltage on capacitor C5 above the threshold triggering level of the output contact trigger 26 the trigger circuit will not trigger the output contact closed. That is, the voltage on C5 is above the threshold level at which transistors Q5 and Q6 are turned off and SCR1 is not triggered. The threshold triggering voltage level is equal to the voltage drop of Zener diode D25 plus the forward drop on light emitting diode LED1 minus the forward drop across diode D24 and the emitter base junction of transistor Q5. This threshold trigger voltage level is approximately 5.4 volts. When the triggering action stops, SCR1 will stop conducting at the end of the current half cycle and the output contact will open and deenergize the contactor coil 16 which will cause the contacts 15 on the contactor 14 to open and interrupt current through the motor windings and the current sensors.

When capacitor C3 has discharged through programmable unijunction transistors Q3, Q3 turns off and removes the base current to Q4 turning Q4 off. C5 is then disconnected from the low level supply capacitor C4 and starts to discharge through resistors R23 and R24 at a slow rate undisturbed by the presence or absence of voltage on the output contact 24. Q5 and Q6 are biased off by the voltage on C5 until the voltage on C5 has decayed to a value less than the threshold voltage of the output contact triggering circuit 26 which is approximately 5.4 volts. When the voltage on C5 has decayed below the threshold voltage the triggering action starts again with Q5 and Q6 conducting to switch on SCR1. This energizes the starter coil 16 and picks up contactor 14 supplying current to motor 12. Resistor R26 is a bias stabilizer resistor for the transistor switch Q5-Q6 and resistor R27 is a shunt resistor for the gate of SCR1 for noise suppressor so as to prevent nuisance tripping of SCR1. Resistor R25 is a current limiting resistor in the Q5-Q6 transistor switch.

Tripped indicator circuit 42 is provided to give a visual indication of when overload relay 10 cannot be reset due to the presence of a voltage on capacitor C5 greater than the threshold voltage. Trip indicator circuit 42 includes a light emitting diode LED1 through which current flows when transistor switch Q5-Q6 is off and output contact 24 is opened. LED1 lights when current flows therethrough thus indicating the output contact trigger 26 is biased off by a voltage on capacitor C5 and output contact 24 cannot be closed, until the reset time delay has elaspsed. The triggering current which would trigger the SCR during normal operation is now shunted through LED1 making it light. Capacitor C6 is provided in the output trigger circuit 26 as a noise voltage filtering capacitor. Thyristor 54 is provided across terminals 18 and 20 to provide surge suppression of high voltage spikes or transients.

Following is a list of component values or types which can be used in the disclosed overload:

| | |
|---|---|
| D1, D2, D3, D4, D5, D6, D7, D8, D9, D10, D11, D12, D30, D31, D32, D33, D14 | 1N4004 |
| R1 | 200K |
| R2 | 1.5M |
| R3 | 3.9M |
| R4 | 1M |
| R5 | 12M |
| R6 | 10M |
| R7 | 3.9M |
| R8 | 330K |
| R9 | 12M |
| R10 | 12M |
| R11 | 22M |
| R12 | 22M |
| R13 | 16M |
| R14 | 22M |
| R15 | 3.9M |
| R16 | 3.9M |
| R17 | 3.9M |
| R18 | 4.7K |
| R19 | 200K |
| R20 | 1K |
| R21 | 10K |
| R22 | 150Ω |
| R23 | 18M |
| R24 | 10M |
| R25 | 4.7K |
| R26 | 200K |
| R27 | 1K |
| R28 | 6K |
| R29 | 100Ω |
| R30 | 100K |
| R31 | 500K |
| D13 | 1N969B |
| D15, D16, D18, D21, D23, D26, D27, D28, D29 | 1N4148 |
| D19 | 1N961B |
| D20 | 1N967B |
| D17, D24 | 1N457 |
| D22 | 1N965B |
| D25 | 1N751A |
| C1 | .33/200V |
| C2, C6 | .01/100V |
| C3 | 10/50V |
| C4 | 47/35V |
| C5 | 5/50V |
| C8 | .022/400V |
| Q1, Q5 | 2N2907A |
| Q2, Q4, Q6 | 2N2222 |
| Q3 | 2N6028 |
| LED1 | MV450 |
| SCR1 | 2N4442 |
| 54 | |

The disclosed solid state overload relay has several advantages over the prior art such as: (1) the reset circuit is functionally equivalent to a thermal overload with automatic reset; (2) positive switching action on the sensing circuit will allow the tester to calibrate the relay setting without having to wait for the relay to time out; (3) a shorter trip time is provided for the same overload current level when the motor is running than during a cold start; (4) the reset lockout feature is not dependent on supply voltage and operates only when the relay trips due to an overload current; and, (5) a trip indicating circuit whic utilizes a solid state light emitting diode as the indicator.

We claim as our invention:

1. An electronic overload relay connectable in series with the operating coil of a contactor for protecting a motor from overheating due to carrying greater than selected current comprising:

an output contact connected in series with the contactor coil being switchable between a high resistance level where current flows through the coil as limited and the contactor is unenergized and a low resistance level where there is sufficient current flow through the coil to energize the contactor;

output contact trigger means connected to said output contact for switching said output contact to the high resistance level or the low resistance level;

current sensing means connected to sense motor current and to supply an output signal proportional to motor current;

time delay means connected between said output contact trigger means and said current sensing means and being responsive to the level of the output signal from said current sensing means to energize said output contact trigger means after a time delay only when a current greater than a selected current flows to the motor;

said output contact trigger means being constructed to switch said output contact to the high resistance level when energized from said time delay means;

said output contact trigger means comprises a first energy storage means for storing energy when said output contact trigger means is energized from said time delay means and being connected to keep said output contact trigger means energized for a predetermined time after the energizing signal from said time delay is removed without requiring any external power thus maintaining said output contact at the high resistance level and preventing the contactor from being energized for the predetermined time.

2. An electronic overload relay as claimed in claim 1 including:

tripped indicator means connected to said output contact trigger means for indicating when said output contact is switched to the high resistance level; and, said tripped indicator means comprises a light source which lights when said output contact is switched to the high resistance level.

3. An electronic overload relay as claimed in claim 2 wherein:

said light source comprises a light emitting diode.

4. An electronic overload relay as claimed in claim 1 including:

rating adjustment means connected between said current sensing means and said time delay means for varying the level of the output signal from said current sensing means to change the selected current level at which said output contact trigger means is energized.

5. An electronic overload relay as claimed in claim 1 wherein:

said time delay means has an inverse time output signal characteristic so that the time delay after which said output contact trigger means is energizes is a function of the current flow to the motor; and including, rating adjustment means connected between said current sensing means and said time delay means for varying the level of the output signal from said current sensing means to change the selected current level at which said output contact trigger means is energized.

6. An electronic overload relay as claimed in claim 5 comprising:

tripped indicator means connected to said output contact trigger means for indicating when said output contact is switched to the high resistance level; and, said tripped indicator means comprises a light source which light when said output contact is switched to the high resistance level.

7. An electronic overload relay as claimed in claim 5 wherein:

said time delay means comprise turn-off trigger means connected to said output contact trigger means and a timing capacitor circuit which is charged from the output signal from said current sensing means; and, said turn-off trigger circuit means connected to said timing capacitor and being responsive to the voltage level of said timing capacitor to energize said output contact trigger means when the voltage level on said timing capacitor exceeds a predetermined point.

8. An electronic overload relay as claimed in claim 7 wherein:

said turn off trigger means comprises a programmable unijunction transistor; including, low level direct current supply means being powered from said current sensing means and connected to said turn-off trigger means for supplying a reference voltage; and, said low level direct current supply means comprises a second energy storage means which transfers energy to said first energy storage means when said output contact trigger means is energized.

9. An electronic overload relay as claimed in claim 8 comprising;

high voltage level filter means connected to the output of said rating adjustment for smoothing the output signal; and, trip level switch means connected between said high voltage level filter means and said time delay means and controlling the voltage level supplied to said timing capacitor from a first level less than the reference voltage to a second level greater than the reference voltage and a function of the output signal.

10. A solid state overload relay connectable in series with the coil of a motor contactor for protecting the motor from overload currents comprising:

output contact means switchable between a first state wherein the coil can be energized and a second state wherein the coil cannot be energized;

output contact trigger means, connected to said output contact means for switching said output contact means to the first state or the second state, comprising first capacitive stored energy means for maintaining said output contact means in a second state when charged above a predetermined trip level;

current sensing means connected to sense motor current and to supply an output signal proportional to motor current;

trip means connected between said current sensing means and said output trigger means comprising a second capactive stored energy means and a time delay means;

said second capacitive stored energy means being charged rapidly to a predetermined level when the motor contactor is closed;

said time delay means connected to permit energy to flow from said second capacitive stored energy means to said first capacitive stored energy means, raising said first stored energy means above the predetermined trip level and maintaining said output contact means in a second state, a time delayed period after motor current exceeds a predetermined value.

11. A solid state overload relay as claimed in claim 10, comprising:

a light emitting diode connected to be energized when said first capacitive stored energy means is charged above a predetermined level indicating said output contact means is in the second state.

12. A solid state overload relay as claimed in claim 10, wherein;

said time delay means constructed to disconnect said first capacitive stored energy means from said second capacitive stored energy means, after they have been connected due to motor current exceeding a predetermined value, when the voltage levels of both capacitive stored energy means have equalized.

13. A solid state overload relay as claimed in claim 10, compising:

activating means connected to switch said output contact means to the first state at predetermined intervals unless said first stored energy means is raised above the predetermined trip level.

14. A solid state overload relay as claimed in claim 10, comprising:

energy dissipation means connected to said first capacitive stored energy means for draining off energy from said first capacitive stored energy means at a determinable rate.

15. A solid state overload relay as claimed in claim 10, comprising:
trip level adjustment means connected to said trip means for changing the current level above which said time delay means is activated.

16. A solid state overload relay for controlling electric power to a motor comprising:
current transformer means for indicating the current flow to the motor;
first capacitive energy storage means connected to said current transformer for rapidly storing energy when electric power is connected to the motor;
motor disconnecting means for disconnecting the motor from the electric power when activated;
reset capacitive energy storage means connected to activate said motor disconnecting means when charged above a predetermined trip level and being constructed to keep said motor disconnecting means activated for a time delay period without requiring any external power; and,
tripping means for connecting said first capacitive energy storage means to said reset capacitive energy storage when current flow to the motor exceeds a predetermined value for a period of time, which is dependent on the magnitude of the current flow to the motor, to rapidly charge said reset capacitive energy storage means above the predetermined trip level and then to disconnect said first capacitive energy storage means from said reset capacitive energy storage means.

17. A solid state overload relay as claimed in claim 16, including:
indicating light means connected to light when said reset capacitive energy storage means activates said motor disconnecting means.

* * * * *